US007913545B2

(12) United States Patent
Verner et al.

(10) Patent No.: US 7,913,545 B2
(45) Date of Patent: Mar. 29, 2011

(54) TIME AND ANGLE BASED CYLINDER PRESSURE DATA COLLECTION

(75) Inventors: Douglas R. Verner, Sterling Heights, MI (US); Joseph R. Dulzo, Novi, MI (US); Kenneth J. Buslepp, Brighton, MI (US)

(73) Assignee: GM Global Technology Operations LLC

( * ) Notice: Subject to any disclaimer, the term of this patent is extended or adjusted under 35 U.S.C. 154(b) by 341 days.

(21) Appl. No.: 12/143,923

(22) Filed: Jun. 23, 2008

(65) Prior Publication Data

US 2009/0276138 A1 Nov. 5, 2009

Related U.S. Application Data

(60) Provisional application No. 61/049,045, filed on Apr. 30, 2008.

(51) Int. Cl.
*G01M 15/06* (2006.01)

(52) U.S. Cl. ................ 73/114.18; 73/114.26; 73/114.16

(58) Field of Classification Search ............... 73/114.16, 73/114.18, 114.26
See application file for complete search history.

(56) References Cited

U.S. PATENT DOCUMENTS

| | | | | | |
|---|---|---|---|---|---|
| 4,556,030 | A * | 12/1985 | Aono | ........................ | 123/406.42 |
| 5,284,114 | A * | 2/1994 | Fukui | ........................ | 123/406.42 |
| 7,377,262 | B2 * | 5/2008 | Oki et al. | ...................... | 123/435 |
| 7,455,047 | B2 * | 11/2008 | Hashizume et al. | .......... | 123/435 |
| 7,568,467 | B2 * | 8/2009 | Buslepp et al. | ............... | 123/435 |
| 2007/0251494 | A1 * | 11/2007 | Hashizume et al. | ..... | 123/406.41 |
| 2008/0053404 | A1 * | 3/2008 | Mizuno et al. | ........... | 123/406.19 |
| 2009/0055074 | A1 * | 2/2009 | Ishiguro et al. | ............... | 701/102 |
| 2009/0293842 | A1 * | 12/2009 | Akazaki et al. | .......... | 123/406.41 |

* cited by examiner

*Primary Examiner* — Freddie Kirkland, III

(57) ABSTRACT

A control module for determining a time and angle based cylinder pressure includes a crankshaft position determination module that determines a first crankshaft position in an engine at a first time, a time-based cylinder pressure determination module that determines N time-based cylinder pressures in the engine at N times, wherein N is an integer greater than one, and an angle-based cylinder pressure determination module that determines an angle-based cylinder pressure at the first crankshaft position based on the first time, the N cylinder pressures, and the N times.

20 Claims, 4 Drawing Sheets

TIME AND ANGLE BASED CYLINDER PRESSURE DATA COLLECTION

CROSS-REFERENCE TO RELATED APPLICATIONS

This application claims the benefit of U.S. Provisional Application No. 61/049,045, filed on Apr. 30, 2008. The disclosure of the above application is incorporated herein by reference.

FIELD

The present disclosure relates to engine systems, and more specifically to systems and methods for evaluating a cylinder pressure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some vehicles include an internal combustion engine that generates drive torque. More specifically, the engine draws in air and mixes the air with fuel to form a combustion mixture. The combustion mixture is compressed and ignited to drive pistons that are disposed within the cylinders. The pistons drive a crankshaft that transfers drive torque to a transmission and wheels.

A crankshaft position signal is generated based on the rotation of the crankshaft and a cylinder pressure signal is generated based on the pressure in the cylinder. A control module determines an engine position and an engine speed from the crankshaft signal and a cylinder pressure from the cylinder pressure signal. Cylinder pressure is used to control one or more subsystems within the vehicle. Errors in the cylinder pressure measurement can cause inaccurate cylinder pressure computations and therefore may cause one or more vehicle subsystems to operate inefficiently.

Cylinder pressure signals generated in the time and angle domains are used to control spark knock and combustion in the engine, respectively. A control module that determines cylinder pressure from cylinder pressure signals generated in the time and angle domains requires at least two analog-to-digital (A/D) converters, one A/D converter to sample cylinder pressure generated in the time domain and another A/D converter to sample cylinder pressure generated in the angle domain.

Cylinder pressure generated in the angle domain is typically sampled at each degree of rotation of the crankshaft. The location of each degree is predicted based on the engine position and engine speed. Variations in the engine speed may cause errors in the predicted location of each degree, which may cause errors in cylinder pressure sampled in the angle domain.

SUMMARY

A control module comprising a crankshaft position determination module that determines a first crankshaft position in an engine at a first time, a time-based cylinder pressure determination module that determines N time-based cylinder pressures in the engine at N times, wherein N is an integer greater than one, and an angle-based cylinder pressure determination module that determines an angle-based cylinder pressure at the first crankshaft position based on the first time, the N time-based cylinder pressures, and the N times.

A method comprising determining a first crankshaft position in an engine at a first time, determining N time-based cylinder pressures in the engine at N times, wherein N is an integer greater than one, and determining an angle-based cylinder pressure at the first crankshaft position based on the first time, the N time-based cylinder pressures, and the N times.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
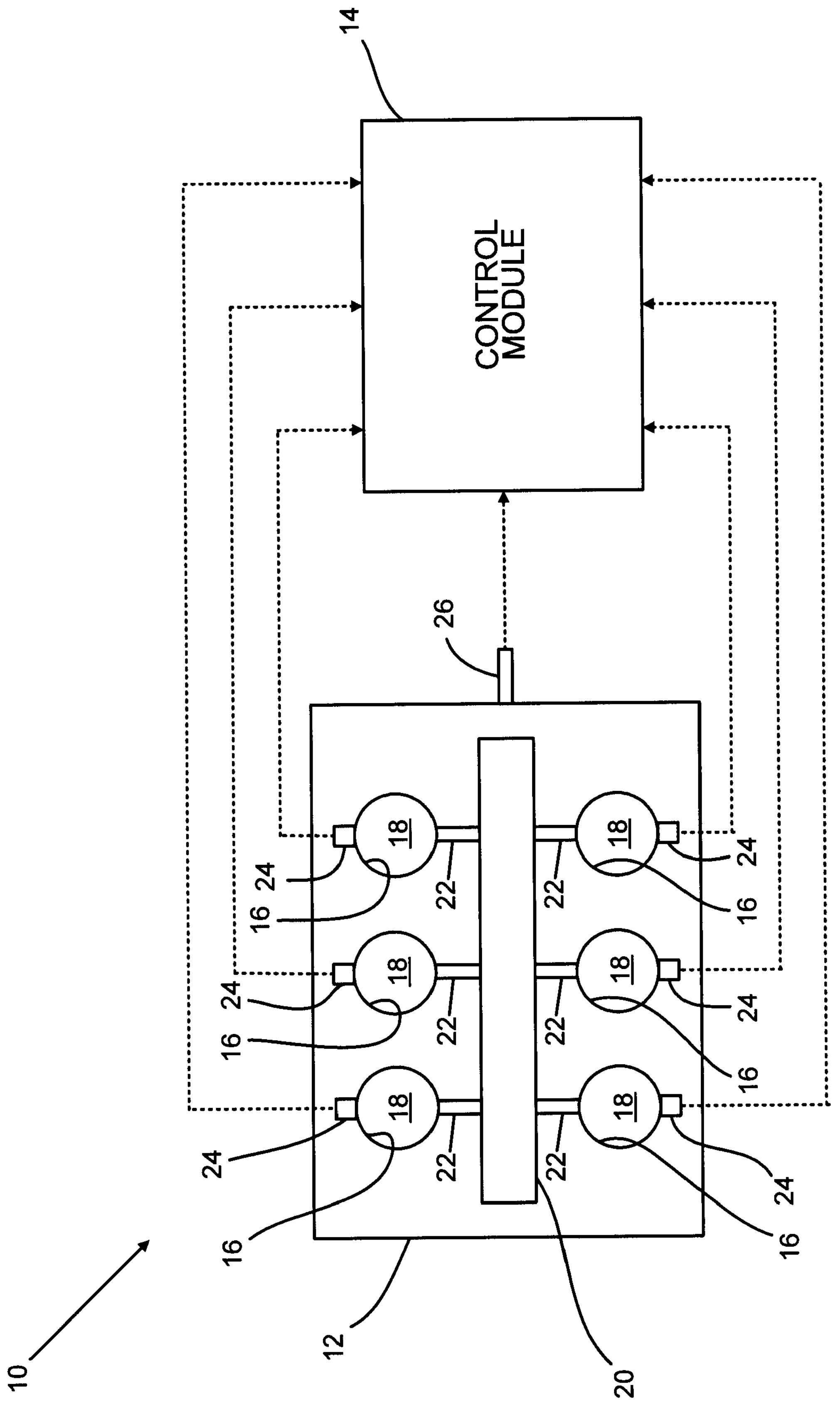
FIG. 1 is a schematic illustration of a vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 is schematically illustrated. The vehicle 10 includes an engine 12 and a control module 14. The engine 12 may be a spark ignition internal combustion engine or a diesel engine. The engine 12 includes a plurality of cylinders 16 having a plurality of pistons 18 disposed for reciprocating motion therein and drivingly engaged with a crankshaft 20 by a series of connecting rods 22.

Cylinder pressure sensors 24 are in communication with cylinders 16 and measure pressures within cylinders 16. Cylinder pressure sensors 24 are in communication with the control module 14. While each cylinder 16 is shown having a cylinder pressure sensor 24 in communication therewith, it is understood that a single one of cylinders 16 may have cylinder pressure sensor 24 in communication therewith and the remainder of cylinders 16 may not, as discussed below. For simplicity, the discussion below will relate to a single cylinder 16 and a single cylinder pressure sensor 24.

The cylinder pressure sensor 24 provides a signal indicative of a pressure within the cylinder 16 to the control module 14. A crankshaft position sensor 26 provides a signal indicative of the position of the crankshaft 20 to the control module 14. The control module 14 determines a pressure in the cylinder 16 at a degree of rotation of the crankshaft 20 based on the pressure within the cylinder 16 and the position of the crankshaft 20.

Figure 2:
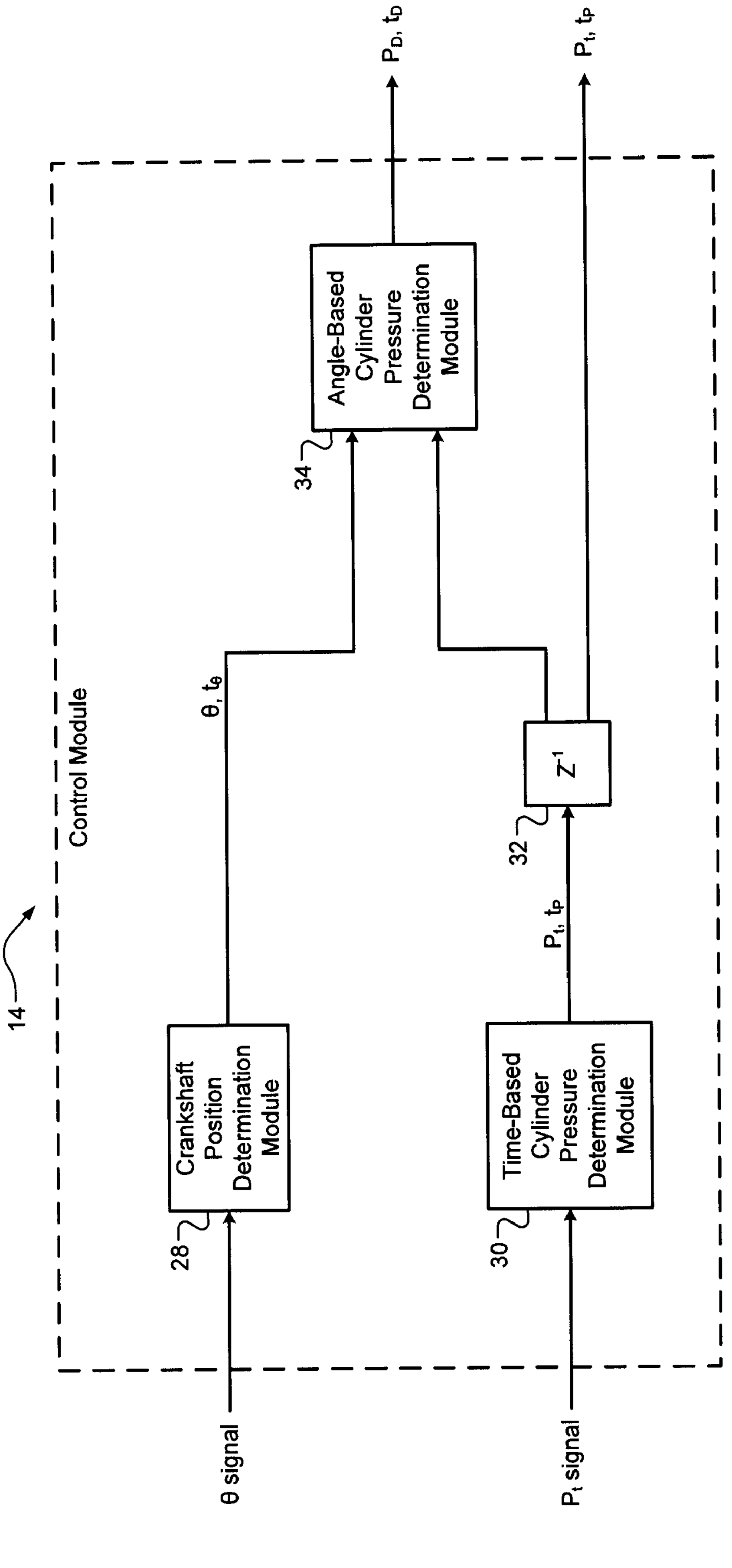
FIG. 2 is a functional block diagram of the control module shown in FIG. 1.

Referring now to FIG. 2, the control module 14 includes a crankshaft position determination module 28, a time-based cylinder pressure determination module 30, a buffer 32, and an angle-based cylinder pressure determination module 34. The crankshaft position determination module 28 is in communication with the angle-based cylinder pressure determination module 34. The crankshaft position determination module 28 determines a crankshaft position occurring at a corresponding time based on the crankshaft position signal provided by the crankshaft position sensor 26. The crankshaft position determination module 28 provides a signal indicative of the determined crankshaft position and the corresponding time to the angle-based cylinder pressure determination module 34.

The time-based cylinder pressure determination module 30 is in communication with the buffer 32. The time-based cylinder pressure determination module 30 determines a cylinder pressure based on the signal indicative of cylinder pressure from the cylinder pressure sensor 24. The time-based cylinder pressure determination module 30 may include a filter (not shown) that filters the signal indicative of cylinder pressure to improve the accuracy of the determined cylinder pressure. The time-based cylinder pressure determination module 30 may also include an analog-to-digital (A/D) converter (not shown) that samples a signal indicative of the cylinder pressure at a predetermined rate that enables over-sampling. The time-based cylinder pressure determination module 30 provides a signal indicative of the determined cylinder pressure and a corresponding time to the buffer 32.

The buffer 32 is in communication with the angle-based cylinder pressure determination module 34 and an output of the control module 14. The buffer 32 stores a plurality of cylinder pressures occurring at a plurality of times based on the signal indicative of the determined cylinder pressure and the corresponding time from the time-based cylinder pressure determination module 30. The buffer 32 has sufficient memory to store the plurality of cylinder pressures and the corresponding plurality of times with a range of the plurality of times including two times that correspond to crankshaft positions determined at the lowest speed of the engine 12. The buffer 32 provides a signal indicative of the plurality of cylinder pressures and the corresponding plurality of times to the angle-based cylinder pressure determination module 34 and the output of the control module 14, which may be used to control spark knock in the engine 12.

The angle-based cylinder pressure determination module 34 is in communication with the output of the control module 14. The angle-based cylinder pressure determination module 34 determines a cylinder pressure at a degree of crankshaft rotation based on the signal indicative of the determined crankshaft position and the corresponding time from the crankshaft position determination module 28 and the signal indicative of the plurality of cylinder pressures and the corresponding plurality of times from the buffer 32. Since the pressure at a degree of crankshaft rotation is determined based on a time-based cylinder pressure signal, only a single A/D converter is required to determine a time-based cylinder pressure and an angle-based cylinder pressure. The angle-based cylinder pressure determination module 34 provides a signal indicative of the pressure corresponding to a degree of crankshaft rotation to the output of the control module 14, which may be used to control combustion in the engine 12.

Figure 3:
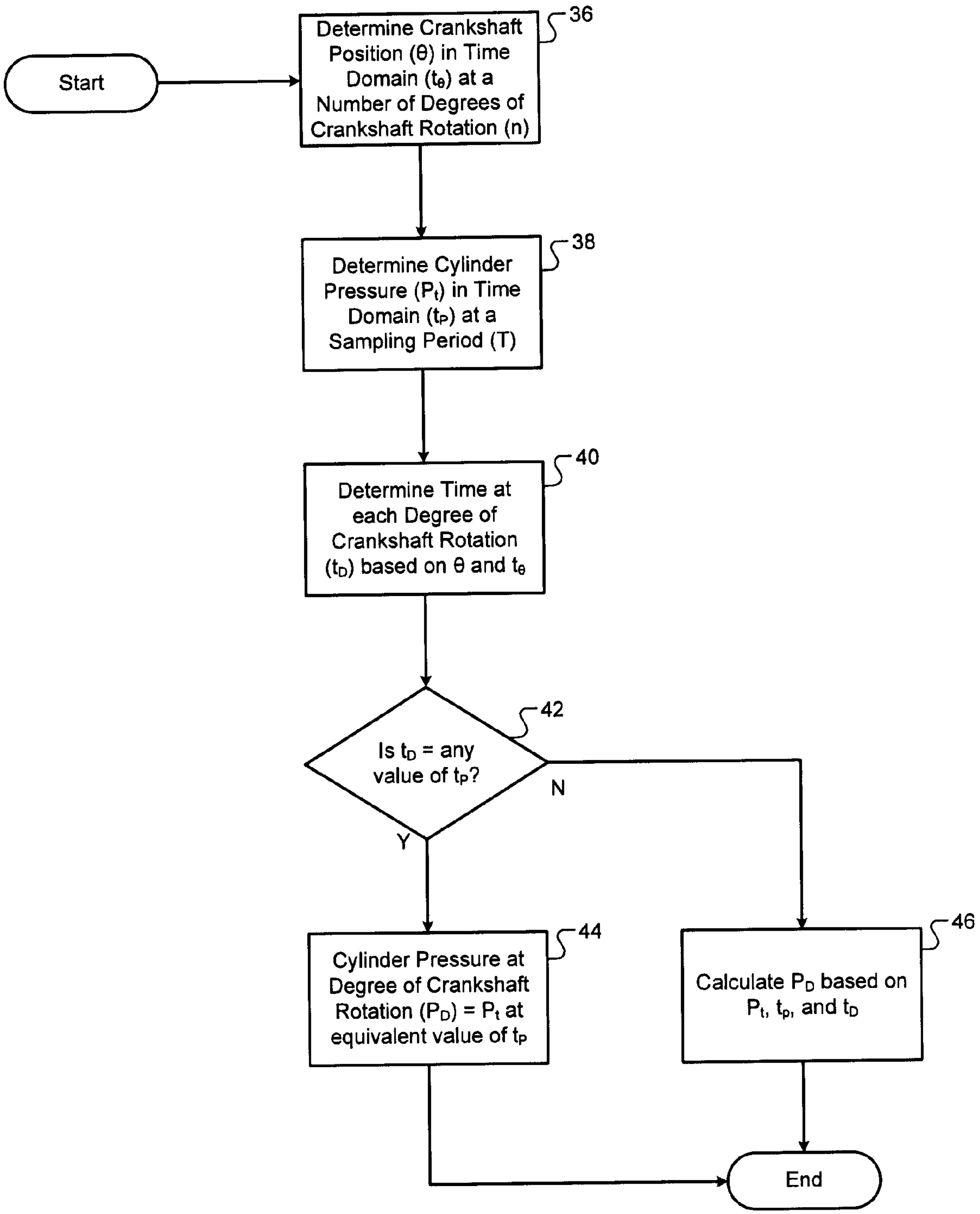
FIG. 3 is a flow chart illustrating a method of determining cylinder pressure according to the present disclosure.

Referring to FIG. 3, exemplary steps executed by the control module 14 to determine a time-based pressure and an angle-based pressure in the cylinder 16 will be described in detail. In step 36, control determines first and second crankshaft positions ($\theta_1$, $\theta_2$) corresponding to first and second times ($t_1$, $t_2$). Crankshaft position may be determined in degrees of rotation of the crankshaft 20 relative to a reference point, such as a position of the piston 18 within the cylinder 16. In step 38, control determines a plurality of cylinder pressures ($P_t$) at a plurality of times ($t_P$) corresponding to a predetermined sampling rate, or inversely, a predetermined sampling period (T).

In step 40, control determines a time at a degree of crankshaft rotation ($t_D$) between said first and second crankshaft positions ($\theta_1$, $\theta_2$) based on the first and second crankshaft positions ($\theta_1$, $\theta_2$) and the first and second times ($t_{\theta 1}$, $t_{\theta 2}$). In this manner, control is back-calculating a location of each degree based on engine position rather than predicting the location of each degree based on engine position and engine speed, which avoids errors in the location of each degree due to variations in engine speed.

In step 42, control compares the time at a degree of crankshaft rotation ($t_D$) to the plurality of times ($t_P$). In step 44, when the time at a degree of crankshaft rotation ($t_D$) is equal to one of the plurality of times ($t_P$), control sets a cylinder pressure at a degree of crankshaft rotation ($P_D$) equal to one of the plurality of cylinder pressures ($P_t$) occurring at the equivalent one of the plurality of times ($t_P$).

In step 46, when the time at a degree of crankshaft rotation ($t_D$) is not equal to one of the plurality of times ($t_P$), control determines the cylinder pressure at a degree of crankshaft rotation ($P_D$) based on the time at a degree of crankshaft rotation ($t_D$), two of the plurality of times ($t_P$) nearest in magnitude to the time at a degree of crankshaft rotation ($t_D$), and two of the plurality of cylinder pressures ($P_t$) occurring at the two of the plurality of times ($t_P$).

Figure 4:
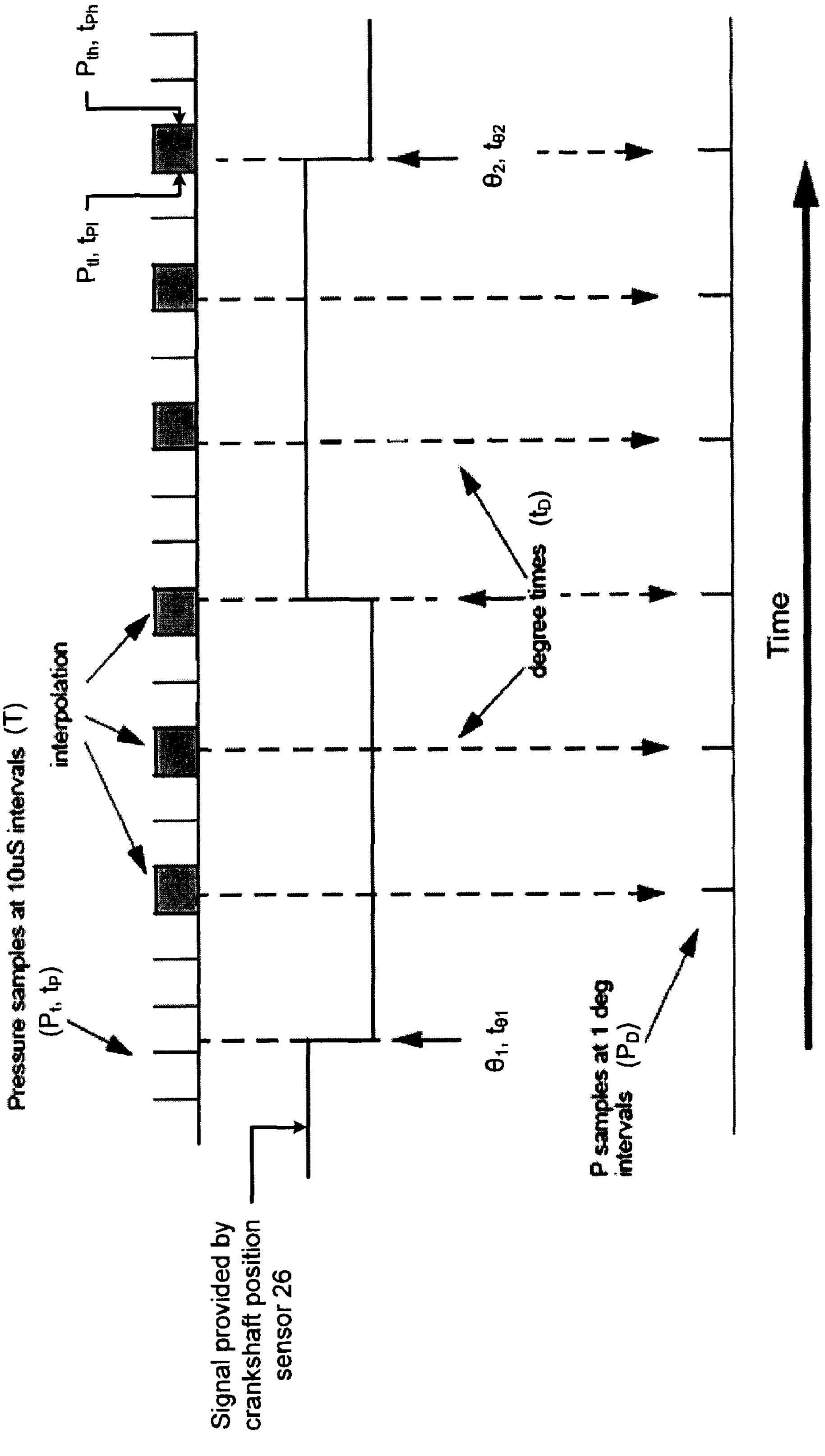
FIG. 4 is a graphical representation of the relationship between time-based cylinder pressure and angle-based cylinder pressure according to the present disclosure.

Referring now to FIG. 4, a graphical representation of the relationship between time-based cylinder pressure and angle-based cylinder pressure may be used to describe exemplary steps of the control module 14 in greater detail. Control determines the plurality of cylinder pressures ($P_t$) at the plurality of times ($t_P$) corresponding to the predetermined sampling period (T), represented by the top row of solid vertical lines. Control may set the predetermined sampling period (T) equal to 10 μs. Control determines the first and second crankshaft positions ($\theta_1$, $\theta_2$) and the corresponding first and second times ($t_{\theta 1}$, $t_{\theta 2}$) at negative-sloped edges of a signal provided by the crankshaft position sensor 26, represented by a stepped line located below the top row of solid vertical lines.

Control determines a time at a degree of crankshaft rotation ($t_D$) by multiplying a time per degree by a difference between the degree and one of the first and second crankshaft positions ($\theta_1$, $\theta_2$) and adding the product to one of the first and second times ($t_{\theta 1}$, $t_{\theta 2}$), respectively. The time at a degree of crankshaft rotation ($t_D$) is represented by the vertical dashed lines. Control determines the time per degree by dividing the difference between first and second times ($t_{\theta 1}$, $t_{\theta 2}$) by the difference between the first and second crankshaft positions ($\theta_1$, $\theta_2$). Control determines a number of samples per degree by dividing the time per degree by the predetermined sampling period (T). Control uses the number of samples per degree as a pointer to the plurality of cylinder pressures relative to a degree of crankshaft rotation.

Control determines the cylinder pressure at a degree of crankshaft rotation ($P_D$) based on the corresponding time at the degree of crankshaft rotation ($t_D$), the plurality of cylinder pressures ($P_t$), and the plurality of times ($t_P$). The cylinder pressure at a degree of crankshaft rotation ($P_D$) is represented by the bottom solid vertical lines. When the time at a degree of crankshaft rotation ($t_D$) is equal to one of the plurality of times ($t_P$), control sets the pressure at the degree of rotation ($P_D$) equal to the one of the plurality of cylinder pressures ($P_t$) occurring at the equivalent predetermined time ($t_P$). When the time at a degree of crankshaft rotation ($t_D$) is not equal to one of the plurality of times ($t_P$), as shown in FIG. 4, control use interpolation to determine the cylinder pressure at the degree of crankshaft rotation ($P_D$) based on the time at the degree of crankshaft rotation ($t_D$), two of the plurality of times immediately lower and higher than the time at the degree of crankshaft rotation ($t_{Pl}$, $t_{Ph}$) and two of the plurality of cylinder pressures corresponding to the two plurality of times ($P_{tl}$, $P_{th}$). For example, control may determine a cylinder pressure at a degree of crankshaft rotation ($P_D$) using the following equation:

$$P_D = P_{tl} + \left[\frac{t_D - t_{Pl}}{t_{Ph} - t_{Pl}}\right](P_{th} - P_{tl})$$

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module, comprising:

a crankshaft position determination module that determines a first crankshaft position of an engine at a first time;

a time-based cylinder pressure determination module that determines N time-based cylinder pressures of said engine at N times, wherein N is an integer greater than one; and an angle-based cylinder pressure determination module that determines an angle-based cylinder pressure at said first crankshaft position based on said first time, at least one of said N times nearest in magnitude to said first time, and at least one of said N time-based cylinder pressures corresponding to said at least one of said N times.

2. The control module of claim 1 wherein said crankshaft position determination module determines a second crankshaft position of said engine at a second time and said angle-based cylinder pressure determination module determines said angle-based cylinder pressure at a predetermined increment of crankshaft rotation relative to said first crankshaft position based on said first and second crankshaft positions, said first and second times, said N time-based cylinder pressures, and said N times.

3. The control module of claim 1 further comprising a filter that filters a signal representative of said N time-based cylinder pressures.

4. The control module of claim 1 further comprising an analog-to-digital converter that samples a signal representative of said N time-based cylinder pressures at a predetermined rate.

5. The control module of claim 2 further comprising a buffer that stores said N time-based cylinder pressures and said N times, wherein a range of said N times includes said first and second times.

6. The control module of claim 2 wherein said first and second crankshaft positions are determined at a predetermined number of degrees of crankshaft rotation.

7. The control module of claim 2 wherein said angle-based cylinder pressure determination module determines said angle-based cylinder pressure at said first and second crankshaft positions and at each degree of crankshaft rotation between said first and second crankshaft positions.

8. The control module of claim 2 wherein said angle-based cylinder pressure determination module determines a third time corresponding to said predetermined increment based on said first and second crankshaft positions and said first and second times.

9. The control module of claim 8 wherein said angle-based cylinder pressure determination module compares said third time to said N times and determines said angle-based cylinder pressure based on one of said N time-based cylinder pressures occurring at one of said N times when said third time is equal to said one of said N times.

10. The control module of claim 8 wherein said angle-based cylinder pressure determination module compares said third time to said N times and determines said angle-based cylinder pressure based on said third time, two of said N times nearest in magnitude to said third time, and two of said N time-based cylinder pressures occurring at said two of said N times when said third time is not equal to one of said N times.

11. A method, comprising:

determining a first crankshaft position of an engine at a first time;

determining N time-based cylinder pressures of said engine at N times, wherein N is an integer greater than one; and determining an angle-based cylinder pressure at said first crankshaft position based on said first time, at least one of said N times nearest in magnitude to said first time, and at least one of said N time-based cylinder pressures corresponding to said at least one of said N times.

12. The method of claim 11 further comprising determining a second crankshaft position of said engine at a second time and determining said angle-based cylinder pressure at a predetermined increment of crankshaft rotation relative to said first crankshaft position based on said first and second crankshaft positions, said first and second times, said N time-based cylinder pressures, and said N times.

13. The method of claim 11 further comprising filtering a signal representative of said N time-based cylinder pressures.

14. The method of claim 11 further comprising sampling a signal representative of said N time-based cylinder pressures at a predetermined rate.

15. The method of claim 12 further comprising storing said N time-based cylinder pressures and said N times, wherein a range of said N times includes said first and second times.

16. The method of claim 12 further comprising determining said first and second crankshaft positions at a predetermined number of degrees of crankshaft rotation.

17. The method of claim 12 further comprising determining said angle-based cylinder pressure at said first and second crankshaft positions and at each degree of crankshaft rotation between said first and second crankshaft positions.

18. The method of claim 12 further comprising determining a third time corresponding to said predetermined increment based on said first and second crankshaft positions and said first and second times.

19. The method of claim 18 further comprising comparing said third time to said N times and determining said angle-based cylinder pressure based on one of said N time-based cylinder pressures occurring at one of said N times when said third time is equal to said one of said N times.

20. The method of claim 18 further comprising comparing said third time to said N times and determining said angle-based cylinder pressure based on said third time, two of said N times nearest in magnitude to said third time, and two of said N time-based cylinder pressures occurring at said two of said N times when said third time is not equal to one of said N times.

* * * * *